(12) United States Patent
Wang et al.

(10) Patent No.: US 6,740,724 B2
(45) Date of Patent: May 25, 2004

(54) ETHYLENE STYRENE COPOLYMER WITH ISOLATED STYRENE

(75) Inventors: Qinyan Wang, Calgary (CA); Patrick Lam, Calgary (CA); Gail Baxter, Calgary (CA); James Arthur Auger, Calgary (CA)

(73) Assignee: Nova Chemicals (International) S. A. (CH)

( * ) Notice: Subject to any disclaimer, the term of this patent is extended or adjusted under 35 U.S.C. 154(b) by 50 days.

(21) Appl. No.: 10/210,416

(22) Filed: Sep. 20, 2002

(65) Prior Publication Data

US 2004/0059072 A1 Mar. 25, 2004

(51) Int. Cl.$^7$ .......................... C08F 212/08; C08F 4/64
(52) U.S. Cl. .................. 526/347; 526/160; 526/161; 526/172; 526/134; 526/336; 526/339; 526/340; 526/347.1
(58) Field of Search ................. 526/160, 161, 526/172, 134, 336, 339, 340, 347, 347.1

(56) References Cited

U.S. PATENT DOCUMENTS

| | | | |
|---|---|---|---|
| 3,390,141 A | 6/1968 | Richards | 260/88.2 |
| 5,043,408 A * | 8/1991 | Kakugo et al. | 526/347 |
| 5,153,157 A | 10/1992 | Hlatky et al. | 520/117 |
| 5,387,568 A | 2/1995 | Ewen et al. | 520/104 |
| 5,652,315 A | 7/1997 | Inoue et al. | 526/153 |
| 5,703,187 A * | 12/1997 | Timmers | 526/282 |
| 5,872,201 A * | 2/1999 | Cheung et al. | 526/282 |
| 6,066,709 A | 5/2000 | Arai et al. | 526/347 |
| 6,191,245 B1 | 2/2001 | Campbell, Jr. et al. | 526/347 |
| 6,239,242 B1 | 5/2001 | Wang et al. | 526/347 |
| 6,664,358 B2 * | 12/2003 | Wang et al. | 526/346 |

* cited by examiner

Primary Examiner—Roberto Rabago
(74) Attorney, Agent, or Firm—Kenneth H. Johnson

(57) ABSTRACT

An ethylene styrene copolymer having isolated styrene monomer units separated by 5 or 6 methylene groups as determined by $^{13}$C-NMR may be polymerized in the presence of an activator and a transition metal catalyst containing a phosphinimine ligand.

16 Claims, 4 Drawing Sheets

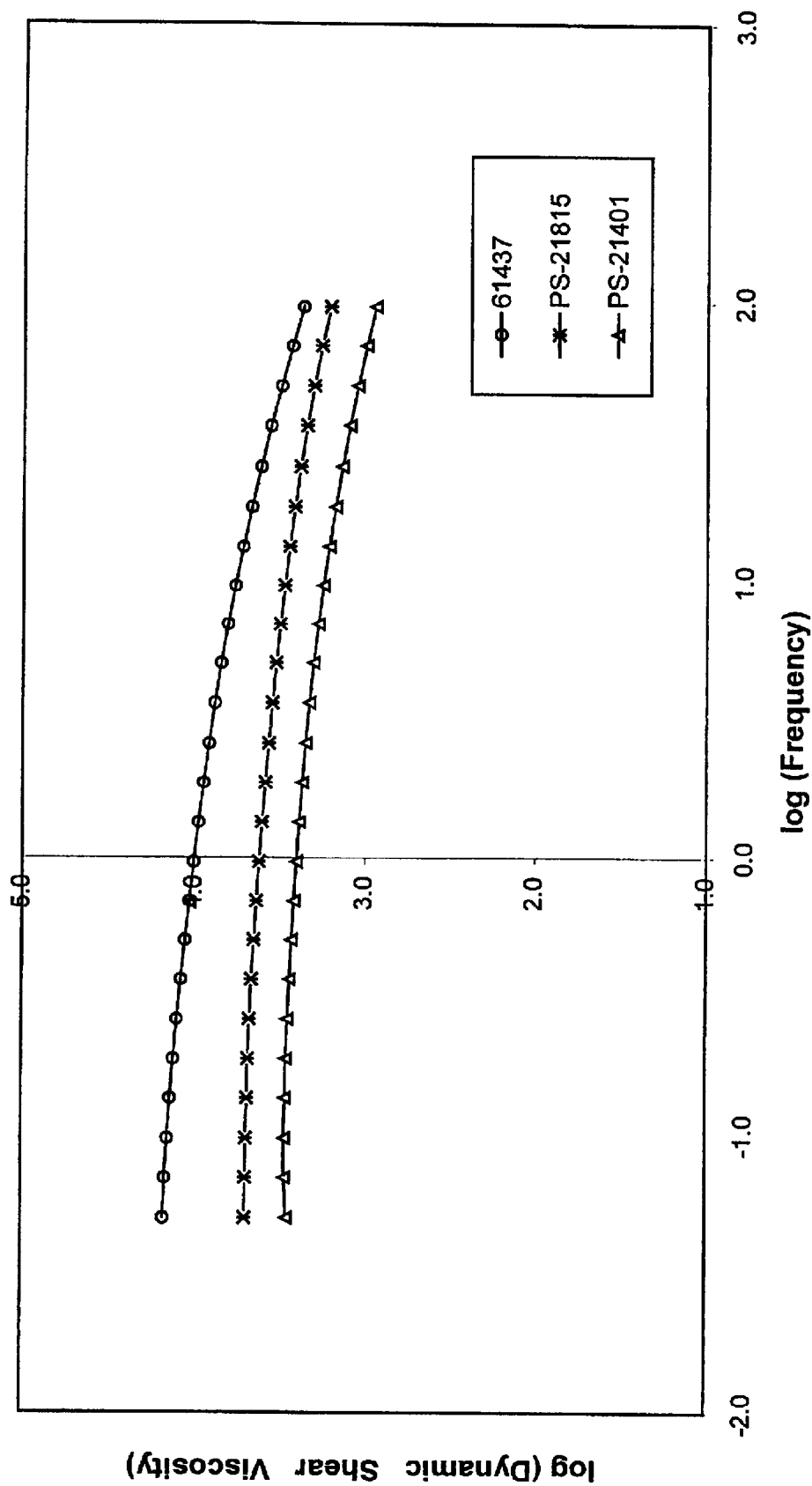

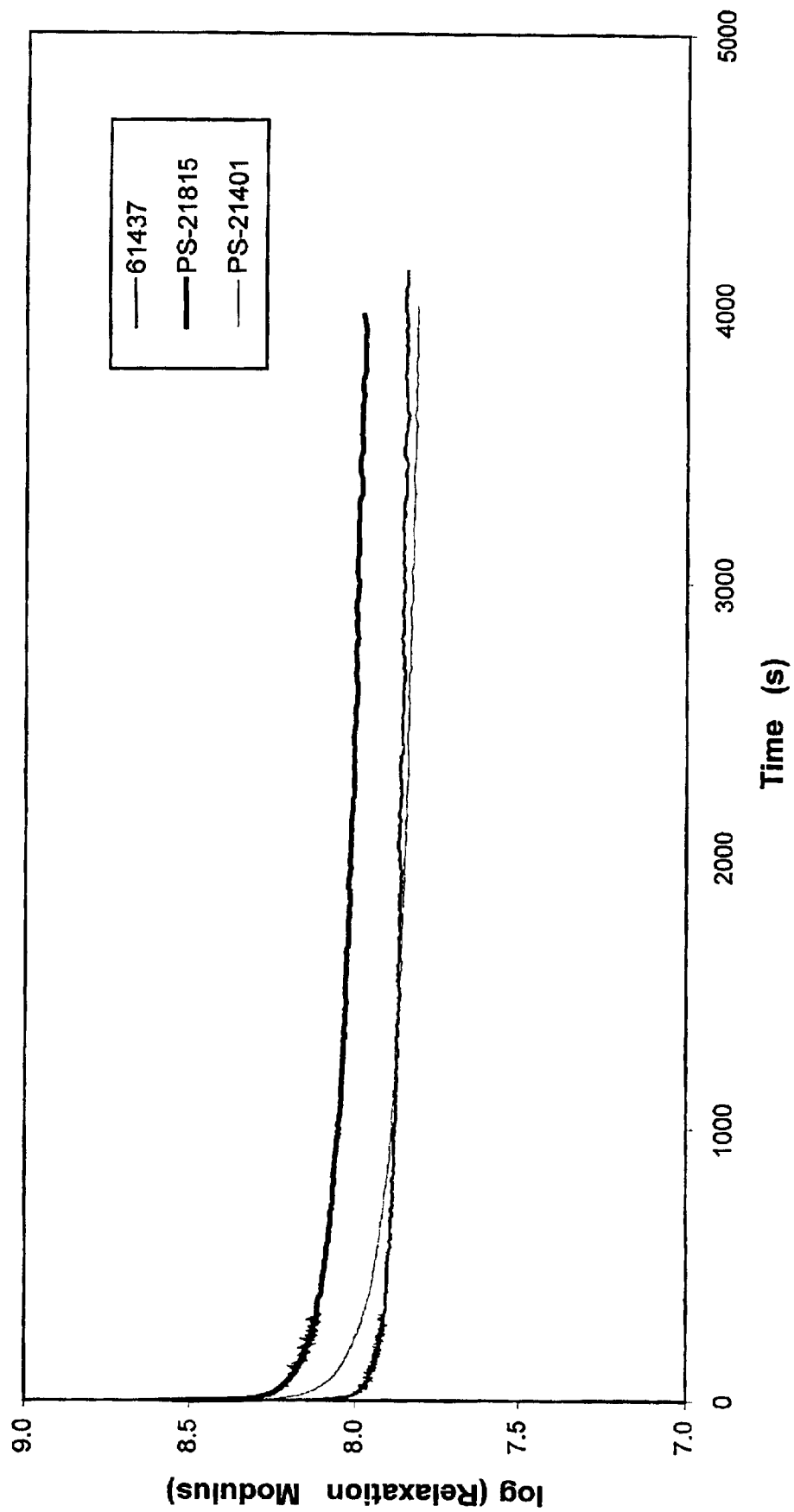
Figure 4. Stress relaxation @ 40 C for ethylene styrene and ethylene octene copolymers

ETHYLENE STYRENE COPOLYMER WITH ISOLATED STYRENE

FIELD OF THE INVENTION

The present invention relates to copolymers of one or more $C_{2-8}$ alpha olefins with one or more $C_{8-20}$ vinyl aromatic monomers, in which the vinyl aromatic monomer is incorporated into the polymer in a manner such that the distribution of vinyl aromatic monomer does not follow a Bernoullian statistical distribution and not less than 90% of the vinyl aromatic monomer is in the form of triads of the structure of $C_{2-8}$ alpha olefin-vinyl aromatic monomer —$C_{2-8}$ alpha olefin as determined by $^{13}C$ NMR.

BACKGROUND OF THE INVENTION

U.S. Pat. No. 6,066,709 issued May 23, 2000 assigned to Denki Kagaku Kogyo, Kabushiki discloses an ethylene styrene copolymer having from 1 to 55 mole % of an isotactic ES alternating structure having a head to tail bond structure (e.g. ESSE). The polymers of the current invention do not have an ethylene and a styrene monomer in alternating manner.

U.S. Pat. No. 6,191,245 issued Feb. 20, 2001, to Campbell et al, assigned to the Dow Chemical Company teaches copolymers of one or more alpha olefins and one or more vinyl aromatic monomers which are substantially random (Col. 6, lines 45–48) containing head to tail insertion (ESSE). Analysis of the polymers of the current invention indicates over 90% of the styrene monomer is isolated and separated by not less than 5 methylene units (in case of ethylene styrene copolymer).

U.S. Pat. No. 5,703,187 issued Dec. 30, 1997, assigned to the Dow Chemical Company teaches pseudo random co-polymers of styrene and ethylene. In the polymers at the present invention the aromatic branches are separated of either 5 or 6 methylene ($CH_2$) units (e.g. EESEES (5 $CH_2$ between branches) or EE$\underline{S}$ (reverse styrene-6 methylene groups between branches). The Dow Patent does not teach this.

There are a number of Idemitsu Kosan Co. Ltd. patents which teach polymers comprising blocks of syndiotactic polystyrene (the phenyl rings are alternating on opposite sides of the backbone) and the olefin is incorporated in repeating units (e.g. olefin blocks). The patent teaches blocks of syndiotactic polystyrene and does not suggest the isolated vinyl aromatic structure of the present invention. Additionally, the process for preparing the block copolymers does not use the catalyst system contemplated by the present invention.

U.S. Pat. No. 6,239,242 B1 issued May 29, 2001 discloses pseudo block polymers of vinyl aromatic monomers and alpha olefins. At least 10 weight % of the vinyl aromatic monomers are incorporated in the form of at least one or more atactic pseudo blocks (three or more vinyl aromatic monomers in conjunction). In the polymers of the present invention the vinyl aromatic monomers are isolated. There are no blocks or pseudo blocks of the vinyl aromatic monomers.

U.S. Pat. No. 3,390,141 issued Jun. 25, 1968 teaches a block copolymer of styrene and ethylene containing from 0.01 to 7 weight % of styrene block polymerized in the presence of a conventional Ziegler-Natta polymerization system. The patent teaches that the styrene is not incorporated into the ethylene backbone of the polymer but rather tends to be in styrene blocks at the end of the olefin homopolymer (Col. 2 lines 55–60). This teaches away from the subject matter of the present patent application as the vinyl aromatic monomer is incorporated into the backbone of the polymer. Further, in the polymers of the present invention the vinyl aromatic monomer is not incorporated in the form of blocks. Rather the vinyl aromatic monomers are separated by 5 or 6 methylene units.

U.S. Pat. No. 5,652,315 issued Jul. 29, 1997 to Inoue et al. assigned to Mitsui Toatsu Chemicals, Inc. teaches the polymerization of an ethylene styrene interpolymer which is substantially random in the presence of a bridged bis cyclopentadienyl transition metal compound in the presence of aluminoxane as an activator. The process of the patent requires the presence of a bridging moiety which has been eliminated in the present invention. Further the polymers of the patent are substantially random. The polymers of the present invention are not substantially random in that they do not have a Bernoullian distribution of monomers. Rather the vinyl aromatic monomers are separated by 5 or 6 methylene units.

SUMMARY OF THE INVENTION

The present invention provides a polymer comprising from 95 to 80 weight % of one or more $C_{2-8}$ alpha olefins; from 5 to 20 weight % of one or more $C8_{-20}$ vinyl aromatic monomers which are unsubstituted or substituted by one or more substituents selected from the group consisting of a chlorine or bromine atom and a $C_{1-4}$ alkyl radical; and from 0 to 10 weight % of one or more monomers selected from the group consisting of $C_{5-9}$ nonconjugated diolefin monomers wherein the vinyl aromatic monomer is incorporated into the polymer in a manner such that the distribution of vinyl aromatic monomers does not follow Bernoullian statistical distribution and not less than 90 % of the branching due to the vinyl aromatic monomer is separated by 5 or 6 methylene groups as determined by $^{13}C$ NMR.

The present invention further provides a process for preparing the above interpolymer comprising contacting a monomer mixture comprising from 0.5 to 0.7 mole fraction of one or more $C_{8-20}$ vinyl aromatic monomer which are unsubstituted or substituted by one or more substituents selected from the group consisting of $C_{1-4}$ alkyl radicals; from 0.5 to 0.3 mole fraction of one or more monomers selected from the group consisting of $C_{2-8}$ aliphatic alpha olefins and optionally from 0 to less than 0.1 mole fraction one or more monomers selected from the group consisting of $C_{5-9}$ nonconjugated diolefins with a catalyst comprising a phosphinimine compound of the formula;

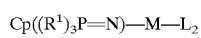

$$Cp((R^1)_3P=N)-M-L_2$$

wherein each $R^1$ is independently selected from the group consisting of $C_{3-6}$ alkyl radicals which are unsubstituted or substituted by a heteroatom, provided that there is a carbon phosphorus bond and the CPN bond angle is less than 108°, Cp is selected from the group consisting of a cyclopentadienyl, indenyl and fluorenyl radicals which are unsubstituted or substituted by one or more substitutents selected from the group consisting of $C_{1-6}$ alkyl radicals which are unsubstituted or substituted by one or more fluorine atoms; M is selected from the group consisting of Ti, Zr, and Hf, and each L is independently selected from the group consisting of a halogen atom, a hydrogen atom, a $C_{1-10}$ alkyl radical, a $C_{1-10}$ alkoxide radical, and a $C_{6-10}$ aryloxide radical, and at least one activator, at a temperature from 25° C. to 150° C. and a pressure from 15 psi to 15,000 psi.

DETAILED DESCRIPTION

FIG. 3 is the dynamic shear viscosity @ 190° C. for ethylene styrene and ethylene octene copolymers.

FIG. 4 is the stress relaxation @ 400° C. for ethylene styrene and ethylene octene copolymers.

Figure 1:
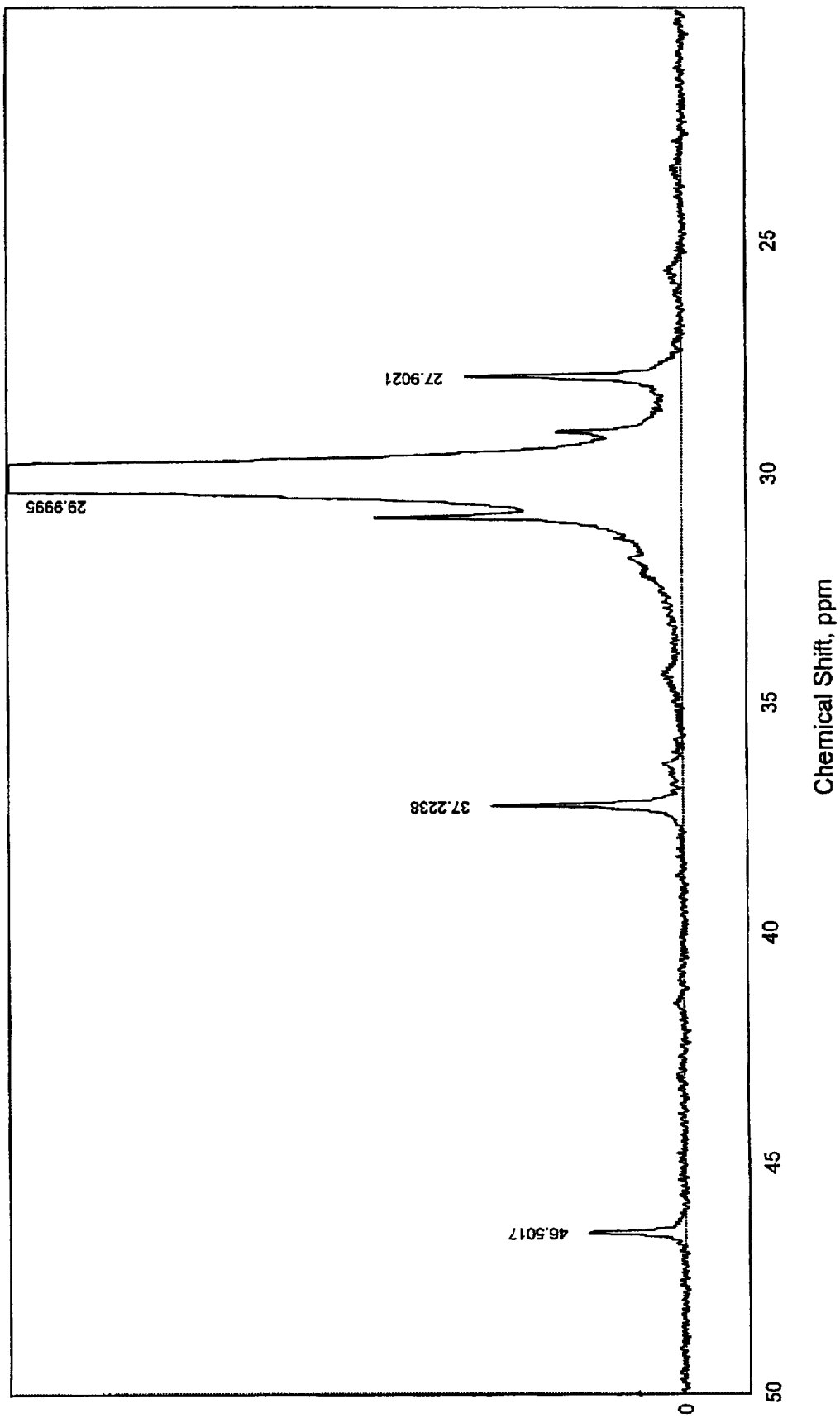
FIG. 1 is a $^{13}$C NMR of the polymer of example 1 after aPS removal.
Figure 2:
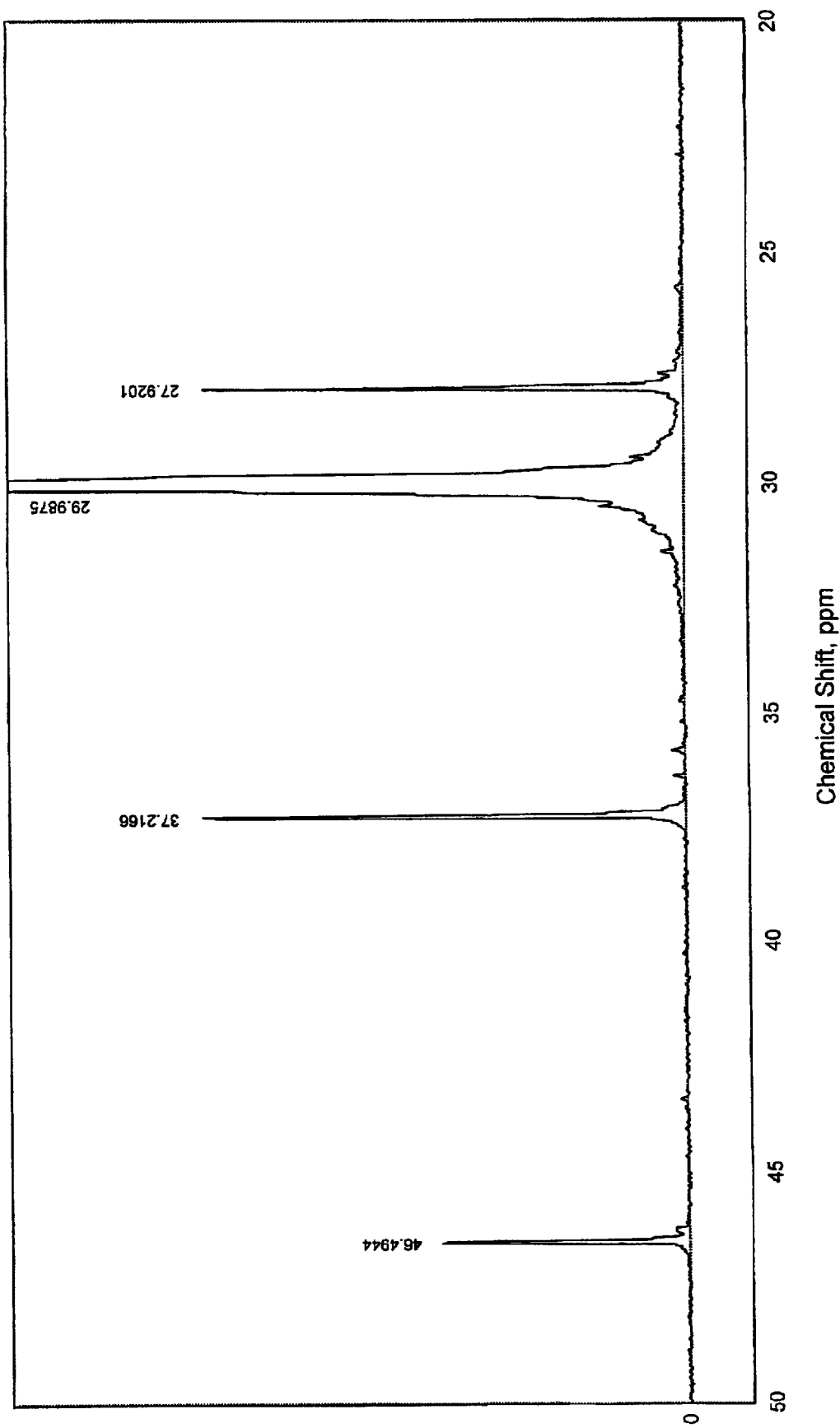
FIG. 2 is a $^{13}$C NMR of the polymer of example 4 after aPS removal.

The present invention relates to polymers of one or more $C_{2-8}$ alpha olefins; one or more $C_{8-20}$ vinyl aromatic monomers, which are unsubstituted or substituted by a $C_{1-4}$ alkyl radical; and optionally one or more $C_{5-9}$ noncojugated diolefins. Suitable olefin monomers include ethylene, propylene, butene, hexene and octene. Generally only one olefin monomer is used, preferably ethylene, but in some instances the olefin monomer may be a combination of about 90 weight % of ethylene and optionally (i.e. from 0 weight %) up to 10 weight % of a monomer selected from the group consisting of propylene, butene, hexene and octene. The vinyl aromatic monomer may be selected from the group consisting of styrene, alpha methyl styrene and p-methyl styrene, preferably styrene. The nonconjugated diolefin monomer may be selected from the group consisting of hexadiene, preferably 1,5-hexadiene, cyclopentadiene and ethylidene norbornene.

The polymers of the present invention generally comprise from 95 to 80, preferably from 90 to 85 weight % of olefin; from 5 to 20, preferably from 10 to 15 weight % of vinyl aromatic monomer; and from 0 to 10 preferably from 5 to 10 weight % of $C_{5-9}$ nonconjugated diolefin. In the polymers of the present invention not less than 90 %, preferably not less than 95 % of the vinyl aromatic monomer is in the polymer in the form of triads of the structure of $C_{2-8}$ alpha olefin—vinyl aromatic monomer—$C_{2-8}$ alpha olefin, which may be inserted at the carbon adjacent the aromatic ring (normal) or the carbon at the end of the vinyl unsaturation (reverse insertion) as determined by $^{13}$C NMR. Preferably essentially all of the vinyl aromatic monomers is in the form of triads of the form noted above and less than 5%, most preferably less than 3% of the vinyl aromatic monomer is in some other configuration.

The presence of the alpha olefin—vinyl aromatic monomer—alpha olefin triad may be detected using $^{13}$C NMR by peaks at about 46.5 ppm, 37.2 ppm, 30 ppm, and 27.9 ppm.

The incorporation of the vinyl aromatic monomer into the above noted triad may be determined by integrating the peaks of the NMR over the appropriate ranges.

The polymers of the present invention generally do not contain a peak for $^{13}$C NMR at a shift (relative to TMS) of about 40.8 to 41.0 ppm (syndiotactic) or 40.5 to 41.0 ppm (atactic polystyrene). The $^{13}$C NMR spectra of the polymers do not have a peak near 40 to 41 ppm, indicating no isotactic polystyrene blocks is present. The $^{13}$C NMR spectra do not have small peaks at about 34 to 34.5 ppm and 34.5 to 35.2 ppm, generally attributed to styrene tail-to-tail insertion within the polymer.

The presence of an isolated styrene unit in a backbone structure of ethylene units yields resonances at 46.2 ppm, 37.2 ppm, 30.0 ppm, and 27.9 ppm which arise from the $T_{\delta\delta}$ methine carbons, $S_{\alpha\delta}$ methylene carbons, the $S_{\delta\delta}$ backbone carbons, and the $S_{\beta\delta}$ methylene carbons, respectively. A resonance at 25.7 ppm is indicative of $S_{\beta\beta}$ methylene carbons found in styrene-ethylene-styrene triads and the corresponding $S_{\alpha\gamma}$ methylene carbons are observed at about 37 ppm. The chain structure which arises from ethylene units containing tail-to-tail insertion of styrene leads to the presence of resonances from the $S_{\alpha\beta}$ methylenes at about 34.0 to 34.5 ppm and 34.5 to 35.2 ppm as outlined in U.S. Pat. No. 5,703,187.

The polymers of the present invention may be prepared by solution or slurry or gas phase polymerization of the monomers in the presence of a catalyst comprising a phosphinimine compound of the formula:

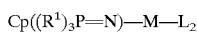

$$Cp((R^1)_3P=N)-M-L_2$$

wherein each $R^1$ is independently selected from the group consisting of $C_{3-6}$ alkyl radicals which are unsubstituted or substituted by a heteroatom, provided that there is a carbon phosphorus bond and the CPN bond angle is less than 108.5°; preferably less than 108.0°; Cp is selected from the group consisting of a cyclopentadienyl, indenyl and fluorenyl radicals which are unsubstituted or substituted by one or more substitutents selected from the group consisting of $C_{1-6}$ alkyl radicals which are unsubstituted or substituted by one or more fluorine atoms; M is selected from the group consisting of Ti, Zr, and Hf, preferably Ti, and each L is independently selected from the group consisting of a halogen atom, a hydrogen atom, a $C_{1-10}$ alkyl radical, a $C_{1-10}$ alkoxide radical, and a $C_{6-10}$ aryloxide radical, and at least one activator.

Typically the activator may be selected from the group consisting of:
  (i) a complex aluminum compound of the formula $R^2_2AlO(R^2AlO)_m AlR^2_2$ wherein each $R^2$ is independently selected from the group consisting of $C_{1-20}$ hydrocarbyl radicals and m is from 3 to 50;
  (ii) ionic activators selected from the group consisting of:
    (A) compounds of the formula $[R^3]^+[B(R^4)_4]^-$ wherein B is a boron atom, $R^3$ is a methyl cation which is substituted by three $C_{5-7}$ aromatic hydrocarbons and each $R^4$ is independently selected from the group consisting of phenyl radicals which are unsubstituted or substituted with 3 to 5 substituents selected from the group consisting of a fluorine atom, a $C_{1-4}$ alkyl or alkoxy radical which is unsubstituted or substituted by a fluorine atom; and a silyl radical of the formula $-Si-(R^5)_3$; wherein each $R^5$ is independently selected from the group consisting of a hydrogen atom and a $C_{1-4}$ alkyl radical; and
    (B) compounds of the formula $[(R^8)_tZH]^+[B(R^4)_4]^-$ wherein B is a boron atom, H is a hydrogen atom, Z is a nitrogen atom or phosphorus atom, t is 2 or 3 and $R^8$ is selected from the group consisting of $C_{1-8}$ alkyl radicals, a phenyl radical which is unsubstituted or substituted by up to three $C_{1-4}$ alkyl radicals, or one $R^8$ taken together with the nitrogen atom may form an anilinium radical and $R^4$ is as defined above; and
    (C) compounds of the formula $B(R^4)_3$ wherein $R^4$ is as defined above; and
  (iii) mixtures of (i) and (ii).

The polymerization may be conducted at a temperature from −40° C. to 160° C., preferably from 20° C. to 150° C. and a pressure from 15 psi to 5,000 psi, preferably from 15 psi to 600 psi. Generally, the polymerization may take place at temperatures from about 20° C. to about 150° C., most preferably from about 60° C. to about 120° C. and at pressures from about 15 psi (103 KPa) up to about 600 psi (4,137 KPa), most preferably from about 50 psi (345 Kpa) to 600 psi.

The polymerization may be conducted in the presence of an inert solvent or diluent. Suitable solvents or diluents are hydrocarbons having from about 5 to 12 carbon atoms or mixtures thereof. These compounds include pentane, hexane, heptane, octane, cyclohexane, methylcyclohexane, benzene, toluene, and hydrogenated naphtha. A commercially available hydrocarbon is ISOPAR®E (a $C_{5-12}$ aliphatic solvent sold by EXXON Chemical Co.).

The polymerization may be conducted using a gas phase polyerization process such as those described in Gas Phase ethylene Polymerization: Production Processes, Polymer Properties and Reactor Modeling by Tuyu Xie, Kim B. MacAuley, James C. C. Hsu and David W. Bacon Ind. Eng. Chem. Res. 1994, 33 449–479.

In the gas phase (and in the slurry phase) polymerization the catalyst needs to be supported. Supports which may be used in accordance with the present invention typically comprise a substrate of alumina or silica having a pendant reactive moiety. The reactive moiety may be a siloxy radical or more typically is a hydroxyl radical. The preferred support is silica or alumina. The support should have a particle size from about 10 to 250 microns, preferably from about 30 to 150 microns. The support should have a large surface area typically greater than about 3 $m^2/g$, preferably greater than about 50 $m^2/g$, most preferably from 100 $m^2/g$ to 1,000 $m^2/g$. The support will be porous and will have a pore volume from about 0.3 to 5.0 ml/g, typically from 0.5 to 3.0 ml/g. Supports, which are specifically designed to be an agglomeration of subparticles are also useful.

It is important that the support be dried prior to the initial reaction with the catalyst or a catalyst component such as an aluminum compound. Generally the support may be heated at a temperature of at least 200° C. for up to 24 hours, typically at a temperature from 500° C. to 800° C. for times from about 2 to 20 hours. The resulting support will be free of adsorbed water and should have a surface hydroxyl content from about 0.1 to 5 mmol/g of support, preferably from 0.5 to 3 mmol/g of support.

In the phosphinimine complex preferably, wherein $R^1$ is a $C_{3-6}$ branched or cyclic alkyl radical (e.g. t-butyl), L is selected from the group consisting of a hydrogen atom, a chlorine atom and a $C_{1-4}$ alkyl radical. Preferably Cp is selected from the group consisting of a cyclopentadienyl radical, an indenyl radical and a fluorenyl radical.

In the aluminum compound (activator) preferably, $R^2$ is a methyl radical and m is from 10 to 40.

The "ionic activator" may abstract one activatable ligand so as to ionize the catalyst center into a cation, but not to covalently bond with the catalyst and to provide sufficient distance between the catalyst and the ionizing activator to permit a polymerizable olefin to enter the resulting active site.

EXAMPLES

Ionic Activators:

triethylammonium tetra(phenyl)boron,
tripropylammonium tetra(phenyl)boron,
tri(n-butyl)ammonium tetra(phenyl)boron,
trimethylammonium tetra(p-tolyl)boron,
trimethylammonium tetra(o-tolyl)boron,
tributylammonium tetra(pentafluorophenyl)boron,
tripropylammonium tetra(o,p-dimethylphenyl)boron,
tributylammonium tetra(m,m-dimethylphenyl)boron,
tributylammonium tetra(p-trifluoromethylphenyl)boron,
tributylammonium tetra(pentafluorophenyl)boron,
tri(n-butyl)ammonium tetra(o-tolyl)boron,
N,N-dimethylanilinium tetra(phenyl)boron,
N,N-diethylanilinium tetra(phenyl)boron,
N,N-diethylanilinium tetra(phenyl)n-butylboron,
di-cisopropyl)ammonium tetra(pentafluorophenyl)boron,
dicyclohexylammonium tetra(phenyl)boron,
triphenylphosphonium tetra(phenyl)boron,
tri(methylphenyl)phosphonium tetra(phenyl)boron,
tri(dimethylphenyl)phosphonium tetra(phenyl)boron,
tropillium tetrakispentafluorophenyl borate,
triphenylmethylium tetrakispentafluorophenyl borate,
tropillium phenyltrispentafluorophenyl borate,
triphenylmethylium phenyltrispentafluorophenyl borate,
benzene (diazonium) phenyltrispentafluorophenyl borate,
tropillium tetrakis (2,3,5,6-tetrafluorophenyl) borate,
triphenylmethylium tetrakis (2,3,5,6-tetrafluorophenyl) borate,
tropillium tetrakis (3,4,5-trifluorophenyl) borate,
benzene (diazonium) tetrakis (3,4,5-trifluorophenyl) borate,
tropillium tetrakis (1,2,2-trifluoroethenyl) borate,
triphenylmethylium tetrakis (1,2,2-trifluoroethenyl) borate,
tropillium tetrakis (2,3,4,5-tetrafluorophenyl) borate, and
triphenylmethylium tetrakis (2,3,4,5-tetrafluorophenyl) borate.

Readily commercially available ionic activators include:

N,N-dimethylaniliumtetrakispentafluorophenyl borate;
triphenylmethylium tetrakispentafluorophenyl borate (tritylborate); and
trispentafluorophenyl borane.

The aluminum compounds (alumoxanes) are typically used in substantial molar excess compared to the amount of metal in the catalyst. Aluminum:transition metal molar ratios of from 10:1 to 10,000:1 are preferred, especially from 50:1 to 500:1.

Another type of activator contains a substantially non-coordinating anion". As used herein, the term substantially non-coordinating anions ("SNCA") are well known components of activator systems which are described, for example, in U.S. Pat. No. 5,153,157 (Hlatky and Turner), and the carbonium, sulfonium and oxonium analogues of such activators which are disclosed by Ewen in U.S. Pat. No. 5,387,568. In general, these SNCA are only weakly coordinated to a cationic form of the catalyst.

In addition to the catalyst and cocatalyst, the use of a "poison scavenger" may also be desirable. As may be inferred from the name "poison scavenger", these additives may be used in small amounts to scavenge impurities in the polymerization environment. Aluminum alkyls, for example triisobutyl aluminum, are suitable poison scavengers. (Note: Some caution must be exercised when using poison scavengers as they may also react with, and deactivate the catalyst.)

The resulting polymer is then recovered and separated from the solvent in a solution process. In a gas phase process the polymer is recovered "dry" when the bed extends above the bed entrainment zone in the reactor. The polymer is then degasses and recovered in granular form. The polymer may then be pelletized. The present invention will now be illustrated by the following non-limiting examples in which unless otherwise specified parts means parts by weight (e.g. grams) and % means weight per cent.

In the examples the following abbreviations have been used.

Tm: polymer melting temperature
St: styrene
C2: ethylene
DSC: differential scanning calorimetry
PD: polydispersity is defined as weight average molecular weight (Mw) divided by number average molecular weight (Mn)
GPC: gel permeation chromatography
MeOH: methanol
PMAO-IP: a type of polymethylaluminoxane
MEK: methyl ethyl ketone
$CH_2Cl_2$: dichloromethane PMAO-IP was purchased from Akzo-Nobel containing 12.7 wt % of Al. MAO was purchased from Albemarle containing 4.52 wt % of Al. Hexane was purchased from Aldrich as a HPLC grade and purified by contact with various absorption media. Toluene was purchased from Aldrich and purified by passing through various absorption media. Toluene was used as a dilution solvent for catalyst/cocatalyst. Styrene was obtained from NOVA's internal styrene plant with about 15 ppm of t-butyl catechol. Ethylene was purchased from Praxair with a polymer grade.

$CpTiNPtBu_3Cl_2(Me_2)$ and $Cp-C_6F_5TiNPtBU_3Cl_2$ were prepared in house according the procedures disclosed in *Organometallics* 1999, 18, 1116–1118.

The procedure to put $Cp-C_6F_5TiNPtBu_3Cl_2$ on to the silica support is as follows:

The supported catalyst was prepared in the glovebox, with calcined XPO2408 silica, MAO, and anhydrous solvents under an overhead stirrer. 107.01 g of XPO2408 was slurried in 750 mL toluene. 399.10 g of MAO was added to the slurry, and this was stirred at room temperature overnight. $Cp-C_6F_5TiNPtBu_3Cl_2$ (3.15 g) was dissolved in 45 mL toluene and added to the slurry. The reaction mixture was stirred for two hours at room temperature, and an additional two hours at 45° C. The slurry was filtered, rinsed with toluene, then heptane, and pumped (vacuum) to dryness. The supported catalyst contained:

11.9 wt % aluminum 0.188 wt % Ti (0.039 mmol Ti/g of support)

General Description of Feed Stream and Styrene Purification.

As are known to those skilled in the art, all the feed streams were purified prior to feeding into the reactor by contact with various absorption media to remove catalysts killing impurities such as water, oxygen, sulfur and polar materials. A purification column packed with DD-2 alumina from Alcoa was used to remove the inhibitor in styrene. Passing the styrene through the column was found to reduce the catechol concentration to less than 1 ppm and the moisture to about 10 ppm.

Method for aPS (Atactic Polystyrene) Removal.

ES in dichloromethane soluble and insoluble fractions were determined using the following procedure:

The Extraction Procedure

1) Grind ES sample through a 20 mesh screen
2) Weigh out 3 g of sample
3) Extract in Soxhlet apparatus with 300 mL of $CH_2Cl_2$ for 7.5 hours
4) Dry Soxhlet in vacuum oven at 50° C. overnight
5) Filter solvent and evaporate solvent in fumehood
6) Collect both soluble and insoluble fractions Instruments FT-IR was conducted using a Nicolet™ Model 750 Magna IR spectrometer.

DSC was conducted using a Perkin Elmer™ Pyris 1 DSC instrument. The starting temperature was −50° C. and data used was second heating after a 10° C. per minute cooling. The heating rate was 10° C. per min.

$I_2$ (melt index) was measured at 190° C. with 2.16 kg of weight using a Tinius Olsen™ MP993.

$I_6$ was measured at 190° C. with 6.16 kg of weight using a Tinius Olsen™ MP993.

Stress Exponent on any Specs Drive.

The molecular weights and molecular weight distributions of ethylene-styrene copolymers were determined by GPC (Water™ 150 C.) with an online viscometer and a FTIR detector.

ES copolymer sample solutions were prepared by dissolving samples in tetrachloroethylene (TCE) at 90° C. The solutions were transferred with a Pasteur pipette to a 4-ml GPC vial and placed in the GPC autosampler carousel for analysis. The infrared spectra were acquired using a Nicole™ Magna 750 FTIR spectrophotometer equipped with OMNIC series operating software and with a DTGS (deuterated triglycine sulfate) detector that was continually purged with nitrogen from which water and $CO_2$ had been removed. The spectra were acquired in the absorbance mode and were background corrected against pure solvent. The differential and inlet pressures were acquired using a Viscotek™ DM400 Data Manager with TriSEC data acquisition software. $^{13}C$ NMR:

Polymers were analyzed by $^{13}C$ NMR spectroscopy at 125° C. using a Bruker™ DPX300 spectrometer operating at 75.47 MHz. Samples were prepared at 5–15 wt % in 10 mm NMR tubes using 1,1,2,2-tetrachloroethane-d2 as the lock solvent. The spectrometer was operated using the following parameters: spectral width, 15, 000 Hz; pulsewidth, 90°; acquisition time, 2.72 seconds; delay, 7.28 seconds; decoupling, bilevel composite pulse decoupling; file size, 64K data pts; linebroadening, 1–2 Hz; number of scans, 8000.

Chemical shifts are based on the isolated methylene backbone resonance occurring at 30.0 ppm versus TMS. This was achieved by referencing the central peak of the 1,1,2,2-tetrachloroethane-d2 to 74.4 ppm.

Stress Relaxation:

The stress relaxation test of polymer samples were conducted on Rheometrics™ RDSII Rheometer at 40° C. The polymer samples were molded into the plaques of 0.035 in. thickness, from which the test coupons of 2.31×0.47×0.035 $in^3$ were prepared. A test coupon was mounted on a torsion fixture inside a temperature-controlled chamber.

The test coupon was conditioned at 40° C. for about 5 minutes and then put under 2% strain for at least 4000 seconds. The decay of stress or relaxation modulus was measured as a function of time.

Tensile Test:

The polymer samples were molded into the plaques of about 0.028 in. thickness from which 5 dog bone specimens of each sample were cut for testing. The test coupons were conditioned at 23° C. and 50% relative humidity for about 24 hours in the laboratory. All tensile tests were conducted using an Instron™ Universal Testing Machine (Model 4204) at 2.0 in/min crosshead rate following the ASTM D638 method. The elongation of the test coupon was measured by using Instron™ X-L extensometer of 1.0 in. gauge length. Tensile properties of all polymers were determined by using Instron™ Series IX Data Acquisition software and were calculated based on the average test results of 5 specimens.

Melt Viscosity:

Dynamic shear viscosity of polymer melt was measured using a Rheometrics™ RDSII rheometer at 190° C. and 10% strain under the nitrogen environment. In the test, a polymer sample was melted at 190° C. on a cone and plate fixture and the frequency was varied from 0.05 to 100 rad/s. The dynamic mechanical results were acquired and analyzed by using Rheometrics™ Orchestrator software.

General Description for Solution Phase Polymerization and Polymer Treatment:

Polymerization reactions were carried out using a 2000 ml Parr reactor. All the chemicals (solvent, styrene, catalyst and cocatalyst) were fed into the reactor batchwise except ethylene, which was fed on demand. The ethylene was controlled using a Hasting mass flow controller set at 10 standard liter per minute (slpm) as a maximum feeding rate. All reaction components were stored and manipulated under an atmosphere of purified argon. Purified hexane was used as the solvent for the reaction. The reaction was monitored using the Labtech™ Notebook software. Temperature control was achieved through the use of an automated temperature control system.

Polymer Treatment:

The polymer solution was collected in a stainless steel bowl and was treated in a water bath at 98° C. to remove un-reacted styrene and solvent. A small amount of anti-oxidant was added. The ES polymers were then dried in a vacuum oven for at least 4 hrs at about 60° C. Polymerization activities were calculated based on weight of the polymer produced, concentration of catalyst and duration of reaction.

The results of the polymerization are set forth in Table 1 and the properties of the resulting polymer are set forth in Table 2.

TABLE 1

Polymerization Results

| Example | St/C$_2$ (mol/mol) | St (mL) | Total Pressure (psig) | Yield (g) | Activity g polymer/ molcat/hr/ psig |
|---|---|---|---|---|---|
| 1 | 2/1 | 138 | 198 | 51.3 | 30.0 |
| 2 | 2/1 | 138 | 196 | 60.4 | 697.6 |
| 3 | 2/1 | 37 | 85 | 12.2 | 16.4 |

Other process conditions: 90° C.; hexane as a solvent; CpTiNPtBu$_3$Cl$_2$ as a catalyst; PMAO-IP as cocatlayst at Al/Ti=30011, catalyst concentration for all the runs is 32 μmol/L except for example 2 (16 μmol/L); run time: 30 min.

TABLE 2

Polymer Properties

| Example | FT-IR (wt % of St) | CH$_2$Cl$_2$ insoluble Fraction | ESE/100C by $^{13}$C - NMR |
|---|---|---|---|
| 1 | 3.3 | 85 | 0.4 |
| 2 | 3.6 | 88 | 0.4 |
| 3 | 9.7 | 90 | 0.4 |

Comparison of ES Products from Example 2 with HDPE Samples with Similar Densities or Similar Comonomer Contents

| Sample | Sample 2 (ES) | PS 21815 (EO) | PS 21401 (EO) |
|---|---|---|---|
| Density (g/cm$^3$) | 0.9489 | 0.9461 | 0.9376 |
| Comonomer type | Styrene | Octene | Octene |
| I$_2$ (g/10 min) | 1.65 | 1.88 | 3.64 |
| I$_6$ (g/10 min) | 12.21 | 7.06 | 15.3 |
| Stress Exponent | 1.82 | 1.22 | 1.31 |
| Mole % Comonomer | 1.0 | <0.1 | 1.2 |
| Weight % Comonomer | 3.7 | <0.4 | 4.7 |
| Heat of Fusion (mJ/mg) | 147.76 | 205.25 | 169.07 |
| Melting Temperature (oC) | 122.54 | 130.73 | 123.55 |
| Secant Modulus @ 1% Strain (MPa) | 603 | 1017 | 619 |
| Yield Strain (%) | 2.79 | 12.05 | 12.00 |
| Yield Stress (MPa) | 12.6 | 23.7 | 23.4 |
| Elongation @ Break (%) | 35 | 1236 | 1196 |
| Tensile Strength (MPa) | 12.4 | 36.3 | 37.4 |

The ethylene styrene copolymer of Example 2 has quite similar density to the ethylene octene copolymer (PS21815), although the former polymer contains higher comonomer content than the latter one. At the similar mole percent of comonomer, the density of the ethylene styrene copolymer of Example 2 is greater than that of the ethylene octene copolymer (PS 21401).

The I$_2$ of ethylene styrene copolymer of Example 2 is similar to that of ethylene octene copolymer (PS21815), but greater than that of ethylene octene copolymer (PS 21401). The stress exponent of ethylene styrene copolymer is significantly greater than that of either ethylene octene copolymer.

At similar mole percent of comonomer, the heat of fusion and melt temperature of ethylene styrene copolymer and ethylene octene (i.e. 61437 and PS21401) are quite close to each other. The heat of fusion and melt temperature of ethylene octene copolymer (i.e. PS 21815) seems to increase as the comonomer content decreases.

Tensile properties of ethylene octene copolymers appear to be superior to ethylene styrene copolymer. Secant modulus, yield stress, yield strain, elongation at break or tensile strength of ethylene styrene copolymer is lower than that of ethylene octene copolymers.

In general, shear viscosity at a given temperature increases as the I$_2$ of the polymer decreases. The ethylene styrene copolymer shows high low-frequency viscosity and considerably low high-frequency viscosity, as compared to the ethylene octene copolymers, FIG. 3. The ethylene styrene copolymer of example 2 shows more prominent shear thinning characteristics than the ethylene octene copolymers (PS21815 and PS 21401).

The ethylene styrene copolymer shows different solid-state relaxation behavior from the ethylene octene copolymers. The ethylene styrene copolymer tends to relax faster than ethylene octene copolymers at t<1000 s, regardless of the comonomer content or melt index of the polymers, FIG. 4. At the similar mole percent of comonomer, the relaxation modulus at long time scale (i.e. t>1000 s) appears to be quite similar for ethylene styrene interpolymer and ethylene octene copolymers.

General Description for Gas Phase Polymerization and Polymer Treatment:

Gas phase experimentation was conducted in a 2000-ml Parr reactor. All the chemicals (seedbed, styrene, catalyst and cocatalyst) were fed into the reactor batchwise except ethylene, which was fed on demand. The ethylene was controlled using a Hasting mass flow controller set at 10 standard liter per minute (slpm) as a maximum feeding rate. All reaction components were stored and manipulated under an atmosphere of purified argon. The reaction was monitored using the Labtech Notebook™ software. Temperature control was achieved through the use of an automated temperature control system. A 160-gram pre-treated NaCl seedbed was transferred to the reactor after conditioning. Prior to use styrene was stored over dririte™ overnight. It was then sparged with argon, filtered and stored in the fridge. After conditioning the reactor was cooled to 90° C. A stock solution of styrene with TiBAL (25wt % tri-isobutyl aluminum (TiBAL) solution in heptane) was prepared. 5 ml of styrene with TiBAL was injected into the reactor (Al/Ti ratio 75/1). The reactor was filled to 100 psig with ethylene and allowed to scavenge for 10 minutes before adding the catalyst. The catalyst was pre-loaded into a transfer tube in the glovebox. A small amount (100-mg) of NaCl was placed in the transfer tube prior to adding the catalyst. A targeted supported catalyst loading of 100 mg was injected into the reactor and chased with 10 ml of a 1-vol. % TiBAL/hexane solution. The catalyst and TiBAL solution was displaced into the reactor using ethylene gas at 200 psig. All polymerizations were performed at a reaction temperature of 90° C. All reactions were run for a total of 60 minutes.

The polymer/salt mixture was washed with multiple washes of water to separate the polymer from the salt. The polymers were dried under vacuum at 40° C. for overnight.

Example 4

The polymerization was conducted as described. 24 g of ethylene styrene copolymer was isolated with a polymerization activity of 13804 g polymer/mmolcat*hr*[C2]. 7.9 wt % of styrene was incorporated as determined by FT-IR. Weight average polymer molecular weight is 121900 with polydispersity of 2.4. The melting point of the polymer is 117.9° C. by DSC. No atactic polystyrene was detected.

What is claimed is:

1. A polymer comprising from 95 to 80 weight % of one or more $C_{2-8}$ alpha olefins and from 5 to 20 weight % of one or more $C_{8-20}$ vinyl aromatic monomers which are unsubstituted or substituted by one or more substituents selected from the group consisting of a chlorine or bromine atom and a $C_{1-4}$ alkyl radical, and from 0 to 10 weight % of one or more monomers selected from the group consisting of $C_{5-9}$ nonconjugated diolefin monomers wherein the vinyl aromatic monomer is incorporated into the polymer in a manner such that the distribution of vinyl aromatic monomers does not follow Bernoullian statistical distribution and not less than 90% of the branching due to the vinyl aromatic monomer is separated by 5 or 6 methylene groups as determined by $^{13}C$ NMR.

2. The polymer according to claim 1, wherein said $C_{2-8}$ alpha olefin is selected from the group consisting of ethylene, propylene, butene, hexene and octene.

3. The polymer according to claim 2, wherein said $C_{8-20}$ vinyl aromatic monomer is selected from the group consisting of styrene, alpha methyl styrene and p-methyl styrene.

4. The polymer according to claim 3, wherein said $C_{5-9}$ nonconjugated diolefin monomer is selected from the group consisting of 1,5-hexadiene, cyclopentadiene and ethylidene norbornene.

5. The polymer according to claim 4, wherein at least 95% of the vinyl aromatic monomer is incorporated into the polymer in the form of triads of the structure of $C_{2-8}$ alpha olefin—vinyl aromatic monomer—$C_{2-8}$ alpha olefin as determined by $^{13}CNMR$.

6. The polymer according to claim 5, wherein the vinyl aromatic monomer is present in an amount from 10 to 15 weight % and the alpha olefin is present in an amount from 90 to 85 weight %.

7. The polymer according to claim 6, wherein the vinyl aromatic monomer is styrene and the alpha olefin is ethylene.

8. A process for preparing a polymer according to claim 1 comprising contacting a monomer mixture comprising from 0.5 to 0.7 mole fraction of one or more $C_{8-20}$ vinyl aromatic monomer which are unsubstituted or substituted by one or more substituents selected from the group consisting of $C_{1-4}$ alkyl radicals; from 0.5 to 0.3 mole fraction of one or more monomers selected from the group consisting of $C_{2-8}$ aliphatic alpha olefins and optionally from 0 to less than 0.1 mole fraction one or more monomers selected from the group consisting of $C_{5-9}$ nonconjugated diolefins with a catalyst comprising a phosphinimine compound of the formula;

$$Cp((R^1)_3P\!\!=\!\!N)\!-\!M\!-\!L_2$$

wherein each $R^1$ is independently selected from the group consisting of $C_{3-6}$ alkyl radicals which are unsubstituted or substituted by a heteroatom, provided that there is a carbon phosphorus bond and the CPN bond angle is less than 108°, Cp is selected from the group consisting of a cyclopentadienyl, indenyl and fluorenyl radicals which are unsubstituted or substituted by one or more substitutents selected from the group consisting of $C_{1-6}$ alkyl radicals which are unsubstituted or substituted by one or more fluorine atoms; M is selected from the group consisting of Ti, Zr, and Hf, and each L is independently selected from the group consisting of a halogen atom, a hydrogen atom, a $C_{1-10}$ alkyl radical, a $C_{1-10}$ alkoxide radical, and a $C_{8-10}$ aryloxide radical, and at least one activator, at a temperature from 25° C. to 150° C. and a pressure from 15 psi to 15,000 psi.

9. The process according to claim 8, wherein M is titanium, each $R^1$ is a tertiary butyl radical; and each L is selected from the group consisting of a halogen atom and a methyl radical.

10. The process according to claim 9, wherein each L is a chlorine atom.

11. The process according to claim 10, wherein each Cp is selected from the group consisting of cyclopentadienyl, indenyl and fluorenyl ligands which are unsubstituted or substituted by one or more $C_{1-4}$ hydrocsarbyl radicals.

12. The process according to claim 11 wherein said at least one activator is selected from the group consisting of:

(i) a complex aluminum compound of the formula $R^2{}_2AlO(R^2AlO)_mAlR^2{}_2$ wherein each $R^2$ is independently selected from the group consisting of $C_{1-20}$ hydrocarbyl radicals and m is from 3 to 50;

(ii) ionic activators selected from the group consisting of:
 (A) compounds of the formula $[R^3]^+[B(R^4)_4]^-$ wherein B is a boron atom, $R^3$ is a methyl cation which is substituted by three $C_{5-7}$ aromatic hydrocarbons and each $R^4$ is independently selected from the group consisting of phenyl radicals which are unsubstituted or substituted with 3 to 5 substituents selected from the group consisting of a fluorine atom, a $C_{1-4}$ alkyl or alkoxy radical which is unsubstituted or substituted by a fluorine atom; and a silyl radical of the formula —Si—$(R^5)_3$; wherein each $R^5$ is independently selected from the group consisting of a hydrogen atom and a $C_{1-4}$ alkyl radical; and (B) compounds of the formula $[(R^8)_t ZH]^+[B(R^4)_4]^-$ wherein B is a boron atom, H is a hydrogen atom, Z is a nitrogen atom or phosphorus atom, t is 2 or 3 and $R^8$ is selected from the group consisting of $C_{1-8}$ alkyl radicals, a phenyl radical which is unsubstituted or substituted by up to three $C_{1-4}$ alkyl radicals, or one $R^8$ taken together with the nitrogen atom may form an anilinium radical and $R^4$ is as defined above; and (C) compounds of the formula $B(R^4)_3$ wherein $R^4$ is as defined above; and (iii) mixtures of (i) and (ii).

13. The process according to claim 12, wherein the temperature is from 80° to 120° C.

14. The process according to claim 13, wherein the process is a solution phase process.

15. The process according to claim 13, wherein the process is a slurry phase process.

16. The process according to claim 13, wherein the process is a gas phase process.

* * * * *